United States Patent
Peng et al.

(10) Patent No.: US 7,254,017 B2
(45) Date of Patent: *Aug. 7, 2007

(54) STORAGE DEVICE ASSEMBLY

(75) Inventors: Wen-Tang Peng, Tu-Chen (TW);
ChengLung Cheng, Shenzhen (CN);
Shu-Gang Shi, Shenzhen (CN); Zhe Zhang, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 145 days.

This patent is subject to a terminal disclaimer.

(21) Appl. No.: 10/890,247

(22) Filed: Jul. 12, 2004

(65) Prior Publication Data
US 2005/0007734 A1   Jan. 13, 2005

(30) Foreign Application Priority Data
Jul. 11, 2003   (TW) .............................. 092212808

(51) Int. Cl.
*H05K 7/00* (2006.01)
*H05K 5/00* (2006.01)
(52) U.S. Cl. ..................... 361/685; 361/727
(58) Field of Classification Search ................ 361/685, 361/727
See application file for complete search history.

(56) References Cited

U.S. PATENT DOCUMENTS

| 6,683,785 | B1 * | 1/2004 | Chen .......................... 361/685 |
| 6,826,056 | B2 * | 11/2004 | Tsuyuki et al. ............. 361/725 |
| 6,879,495 | B2 * | 4/2005 | Jiang .......................... 361/818 |
| 7,072,177 | B2 * | 7/2006 | Peng et al. .................. 361/685 |

FOREIGN PATENT DOCUMENTS

| TW | 525823 | 3/2003 |
| TW | 532497 | 5/2003 |

* cited by examiner

*Primary Examiner*—Lisa Lea-Edmonds
*Assistant Examiner*—Ingrid Wright
(74) *Attorney, Agent, or Firm*—Wei Te Chung (57) ABSTRACT

A storage device assembly includes a tray (10) receiving a hard disk drive (60) therein, a bracket (20) attached in the tray, and a chassis (70). An actuator (30) is pivotally attached to an outer space of the bracket, a slider (40) is slidably attached to an inner space of the bracket, a spring (28) is arranged between the slider and the bracket. The chassis includes a number of spacing plates (73) each defining a pair of apertures (731). The tray includes a sidewall (12) defining a pair of apertures (121). The slider includes a pair of wedge-shaped extension tabs (411). The tray is secured in the chassis, with the extension tabs extending through the apertures of the tray and the chassis. To detach the tray from the chassis, the actuator is pivoted out and presses the slider to withdraw its extension tabs from the apertures of the chassis.

13 Claims, 7 Drawing Sheets

STORAGE DEVICE ASSEMBLY

BACKGROUND OF THE INVENTION

1. Field of the Invention

The present invention relates to a storage device assembly, and in particular to a storage device assembly which can readily and conveniently removing and securing storage devices in a chassis. The invention relates to a contemporarily filed application titled "MOUNTING MECHANISM FOR STORAGE DEVICE" with the same inventors and the same assignee as the invention.

2. Description of the Related Art

A typical personal computer invariably comprises one or more data storage devices for communication and handling of data. Such storage devices include, but are not limited to, hard disk drives, floppy disk drives and CD-ROM drives. Users of computers and technicians alike require that a drive bracket of an enclosure of the computer allows them to easily secure storage devices such as disk drives. Conventionally, each disk drive comprises a rigid casing that is retained in the enclosure by means of bolts or rivets. However, insertion and removal of screws is time consuming and cumbersome.

As computers have proliferated and improved, various devices have been developed to facilitate installation and removal of disk drives. One such device comprises two flat rectangular side pieces which are attached to opposite sides of the disk drive. Corresponding receiving rails provided in a drive bracket cooperatively receive the side pieces in sliding engagement. When the disk drive is fully received in the bracket, a screw is tightened so that the screw presses against one of the side pieces or the disk drive itself. However, this mounting system still needs using screws. Additionally, mounting systems using rails require a clearance between the data storage device and the drive bracket. This may cause electromagnetic interference (EMI) problems, and may lead to accumulation of static charges on the computer enclosure. Furthermore, the rails are generally made of plastic. This not only restricts grounding connection options between the data storage device and the drive bracket, but also tends to lead to extra maintenance because of the plastic rails easily wearing out and needing replacement.

Thus an improved storage device assembly which overcomes the above-mentioned drawbacks is desired.

SUMMARY OF THE INVENTION

Accordingly, an object of the present invention is to provide a storage device assembly which allows readily and conveniently removing and securing storage device in a chassis.

To achieve the above-mentioned object, a storage device assembly includes a tray receiving a hard disk drive therein, a bracket attached in the tray, and a chassis. An actuator is pivotally attached to an outer space of the bracket, a slider is slidably attached to an inner space of the bracket, a spring is arranged between the slider and the bracket. The chassis includes a number of spacing plates each defining a pair of apertures. The tray includes a sidewall defining a pair of apertures. The slider includes a pair of wedge-shaped extension tabs. The tray is secured in the chassis, with the extension tabs extending through the apertures of the tray and the chassis. To detach the tray from the chassis, the actuator is pivoted out and presses the slider to withdraw its extension tabs from the apertures of the chassis.

Other objects, advantages and novel features of the present invention will be drawn from the following detailed description of a preferred embodiment of the present invention with attached drawings, in which:

DETAILED DESCRIPTION OF THE INVENTION

Figure 1:
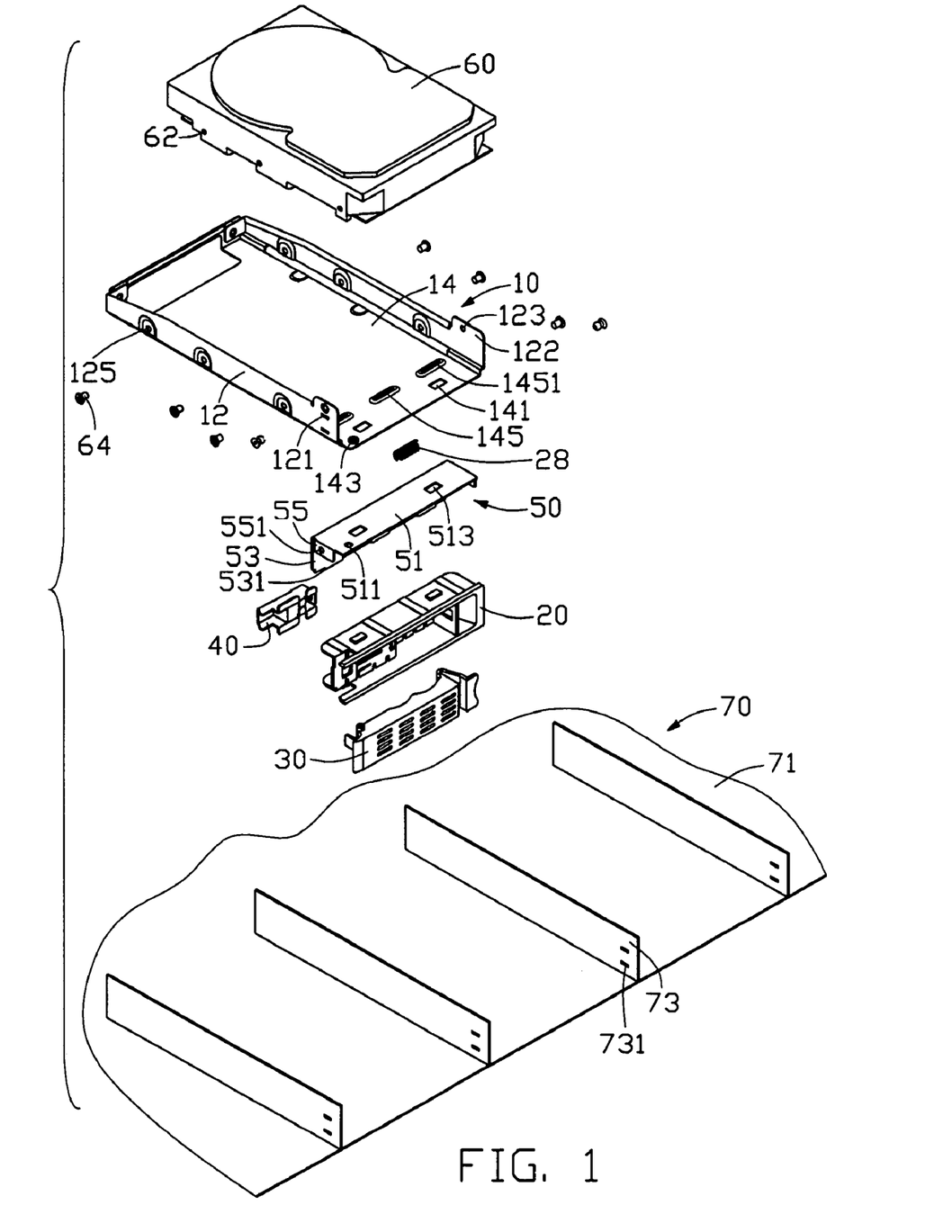
FIG. 1 is an exploded, isometric view of a storage device assembly of the present invention.

Referring to FIG. 1, a storage device assembly of the present invention comprises a tray 10 for receiving a storage device, such as a hard disk 60, a bracket 20 disposed in the tray 10, an actuator 30, a slider 40, a spring 28, a cover 50, and a chassis 70. The actuator 30, the slider 40, the spring 28, and the cover 70 are attached to the bracket 20. The chassis 70 is used for slidably receiving the tray 10 with the hard disk drive 60. The hard disk drive 60 defines a plurality of screw holes 62 in both sides thereof respectively.

The tray 10 comprises a base 14 and a pair of parallel sidewalls 12 extending perpendicularly from opposite edges of the base 14. The sidewalls 12 and the base 14 cooperatively define a space for receiving the hard disk 60 therein. A plurality of through holes 125 is defined in both sidewalls 12 respectively, corresponding to the screw holes 62 of the hard disk drive 60. A fixing hole 123 is defined in a front portion 122 of each sidewall 12. A pair of spaced apertures 121 is defined below the fixing hole 123 in one of the sidewalls 12. A plurality of protrusions 145 each defining a slit 1451 therein is extruded in a front of the base 14. A pair of slots 141 is defined in the base 14 in front of the protrusions 145. A pivot seat 143 defining a pivot hole (not labeled) therein is extruded at a front-left corner of the base 14.

Figure 3A:
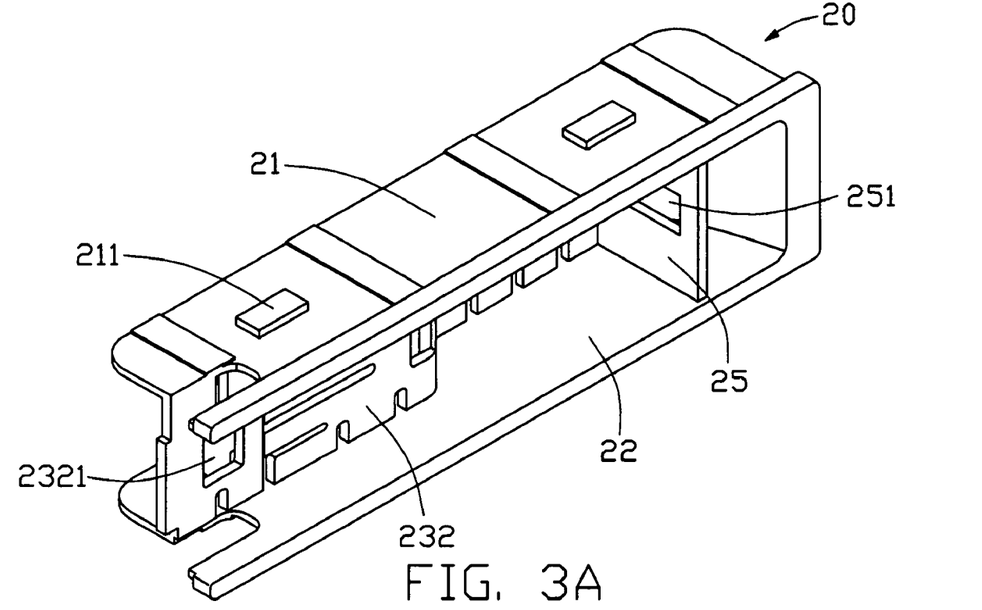
FIG. 3A is an enlarged, isometric views of a bracket of the storage device assembly of FIG. 1.
Figure 3B:
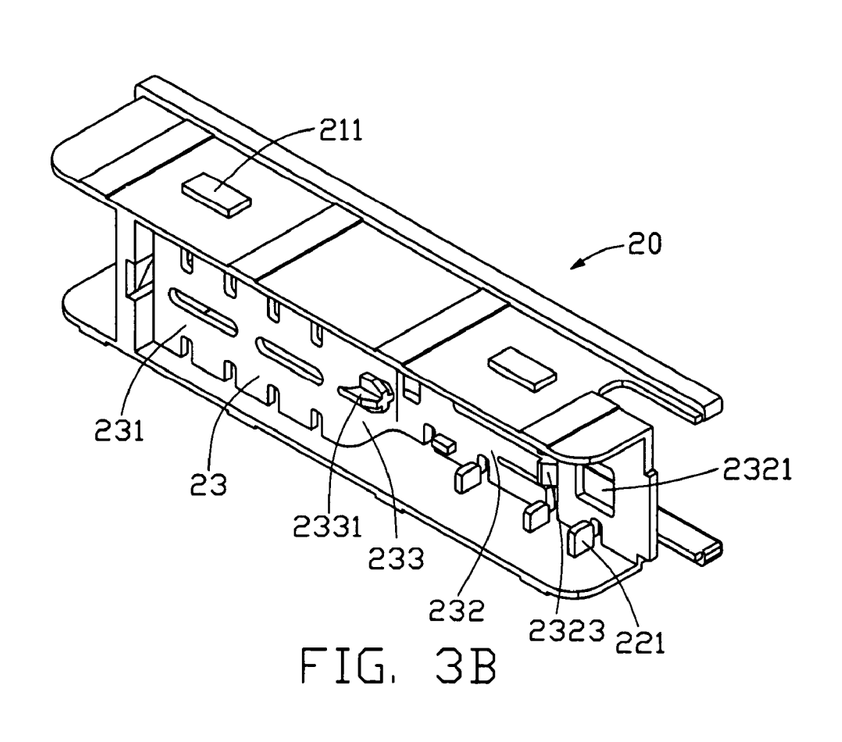
FIG. 3B is similar to FIG. 3A, but viewed from another aspect.

Referring also to FIGS. 3A and 3B, the bracket 20 comprises a top panel 21, a bottom panel 22, and a connecting panel 23 perpendicularly disposed between the top panel 21 and the bottom panel 22. The connecting panel 23 comprises a left part 232, a right part 231, and a middle part 233 smoothly and perpendicularly integrating the left part 232 and the right part 231. The left part 232 parallels to the right part 231. A vertical board 25 defining a cutout 251 therein extends from a right distal edge of the right part 231.

A rectangular opening 2321 is defined in the left part 232 near a left distal end thereof. An inner space is cooperatively defined between the top panel 21, the bottom panel 22, the middle part 233, and the left part 232. An outer space is cooperatively defined between the top panel 21, the bottom panel 22, the middle part 233, the right part 231, and the vertical board 25. A resilient hook 2323 extends horizontally leftwardly in a middle of the left part 232 adjacent the opening 2321. A horizontal post 2331 extends from the middle part 233 into the inner space, for securing the spring 28. A plurality of supports 221 separately extrudes from the bottom panel 23 and the top panel 21 along the left part 232 in the inner space. A pair of blocks 211 extrudes from each of the top panel 21 and the bottom panel 22.

Figure 4A:
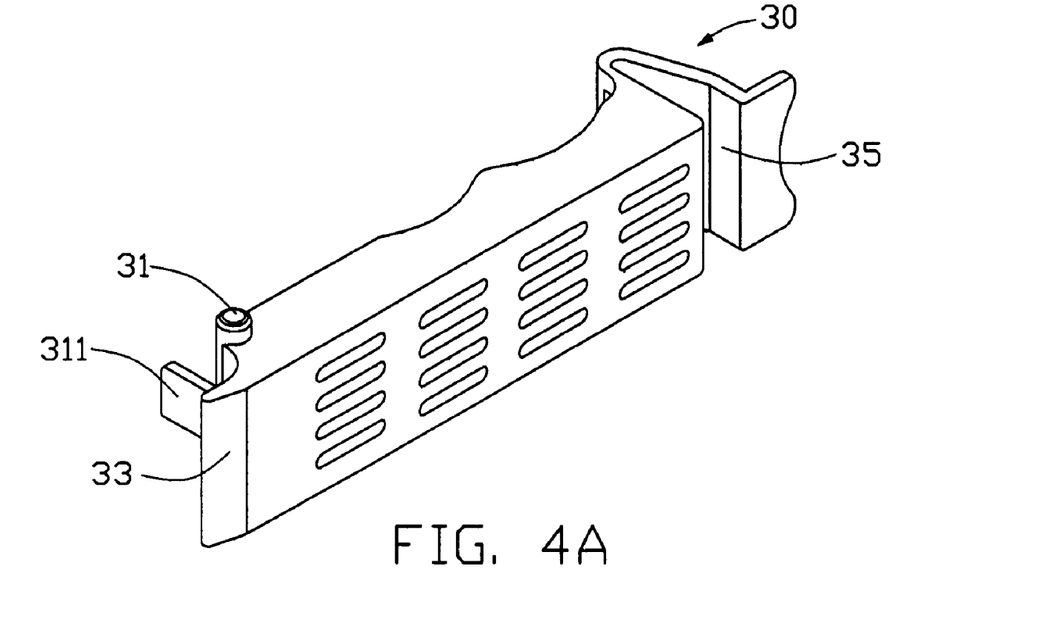
FIG. 4A is an enlarged, isometric views of an actuator of the storage device assembly of FIG. 1.
Figure 4B:
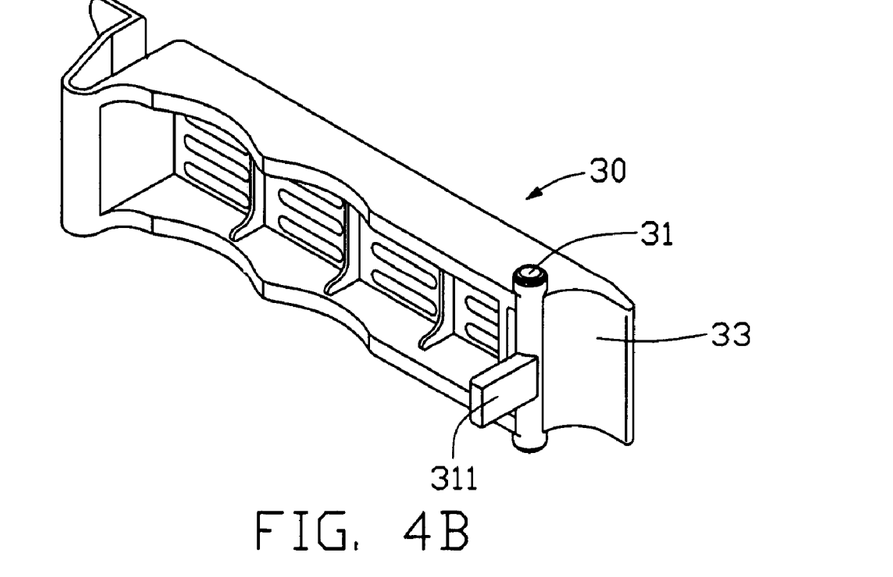
FIG. 4B is similar to FIG. 4A, but viewed from another aspect.

Referring also to FIGS. 4A and 4B, the actuator 30 is to be received in the outer space of the bracket 20. A shaft 31 is formed at a left portion of the actuator 30. An actuating tab 311 extrudes from a middle portion of the shaft 31, for extending through the opening 2321 of the bracket 20. A tail 33 is formed at a left end of the actuator 30. A resilient handle 35 is formed in a right end of the actuator 30. A wedge 351 (referring to the FIG. 6) extrudes outwardly from an outer face of the handle 35, for being engagingly received in the cutout 251 of the vertical board 25 of the bracket 20.

Figure 2A:
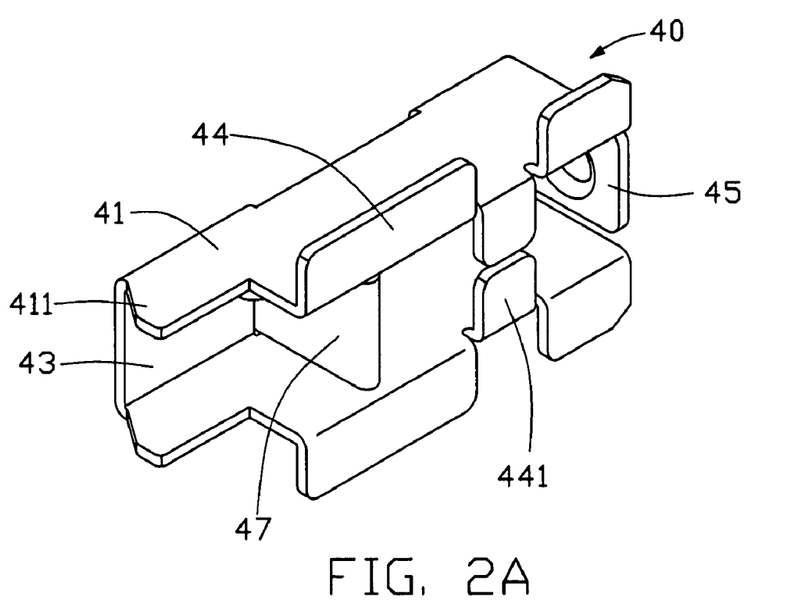
FIG. 2A is an enlarged, isometric views of a slider of the storage device assembly of FIG. 1.
Figure 2B:
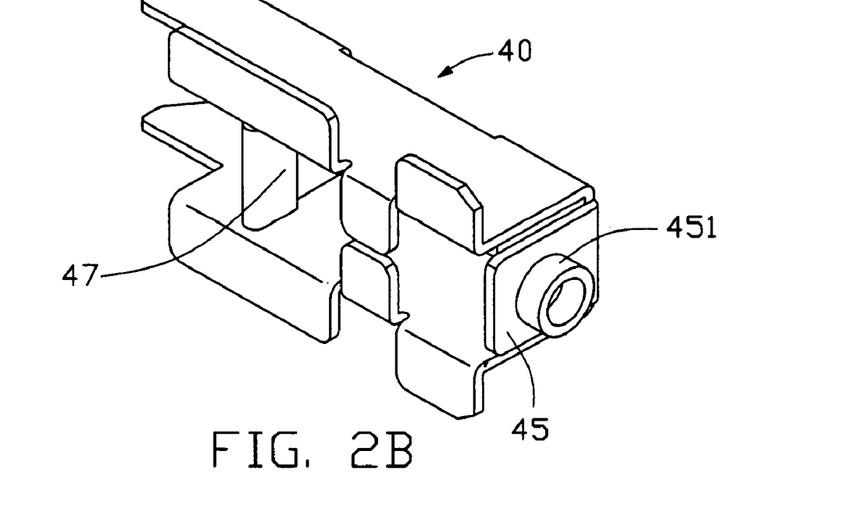
FIG. 2B is similar to FIG. 2A, but viewed from another aspect.

Referring also to FIGS. 2A and 2B, the slider 40 generally having a symmetrical configuration is to be received in the inner space of the bracket 20. The slider 40 comprises a vertical plate 43 and a pair of parallel horizontal plates 41 extending from opposite upper and lower edges of the vertical plate 43. Two pairs of flanges 44 extend perpendicularly in opposite directions from distal edges of the horizontal plates 41 respectively. A stop board 47 is perpendicularly formed between the horizontal plates 41. A pair of bent tab 441 extends toward each other from the horizontal plates 41 between the pairs of flanges 44. A wedge-shaped extension tab 411 is formed from a left end of each horizontal plate 41, for engaging in the apertures 121 of the tray 10. An end plate 45 is perpendicularly formed at a right edge of the vertical plate 43. A post 451 extrudes from the end plate 45, corresponding to the post 2331 of the bracket 20 for holding the spring 28 therebetween.

Referring to FIG. 1, the cover 50 is generally L-shaped. The cover 50 comprises a first plate 51 and a second plate 53 depending from a longitudinal edge of the first plate 51. A pair of slots 513 is defined in the second plate 53. A pivot hole 511 is defined at a left corner of the first plate 51, corresponding to the pivot seat 143 of the tray 10 for pivotally receiving the shaft 31 of the actuator 30. A pair of ears 55 depends from opposite side edges of the first plate 51. A pair of fixing holes 551 is defined in the ears 55, corresponding to the fixing holes 123 of the tray 10. A plurality of tips 531 extends from a bottom of the second plate 53, for engaging in the slits 1451 of the tray 10. A plurality of vents (not shown) is defined in the second plate 53 for allowing air flowing therethrough to dissipate heat.

The chassis 70 comprises a bottom 71 and a plurality of parallel spacing plates 73 perpendicular to the bottom 71, cooperatively defining spaces for receiving a plurality of trays 10. A pair of apertures 731 is defined in each of the spacing plates 73, corresponding to the apertures 121 of the tray 10 for engagingly receiving the extension tabs 411 of the slider 40.

Figure 5:
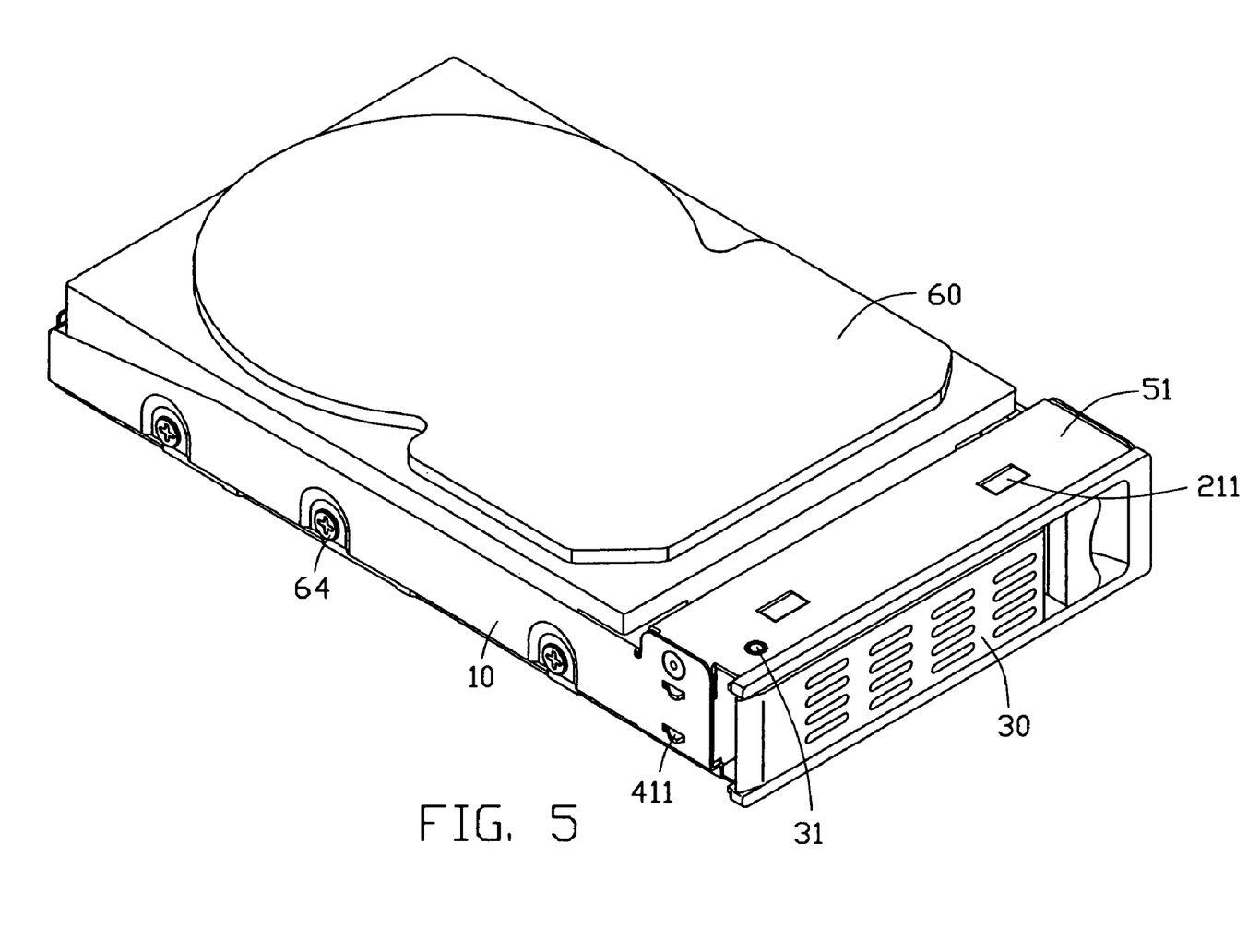
FIG. 5 is a pre-assembled view of the storage device assembly of FIG. 1, but not installed in a chassis.
Figure 6:
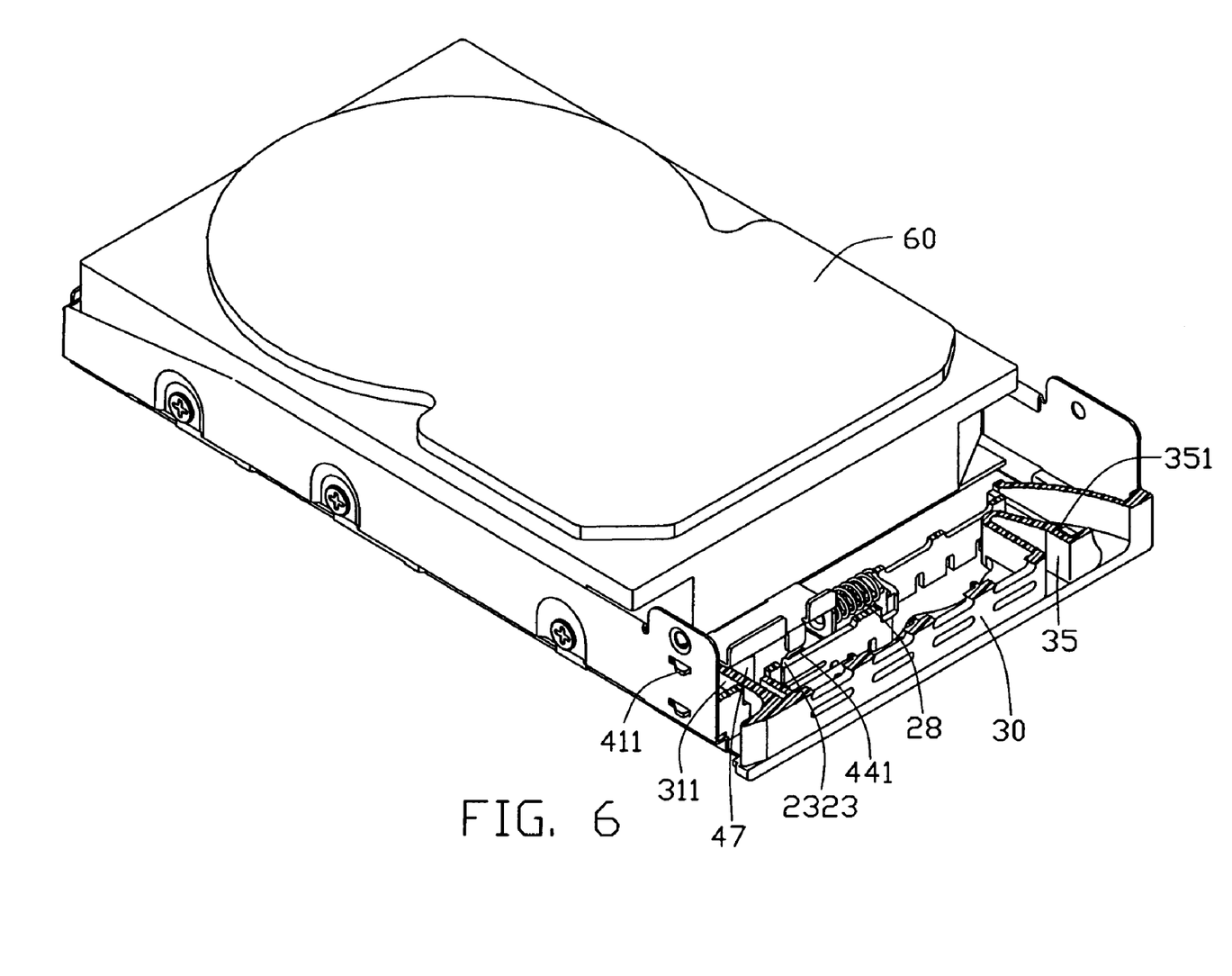
FIG. 6 is similar to FIG. 5, but partly cut off for better illustration.
Figure 7:
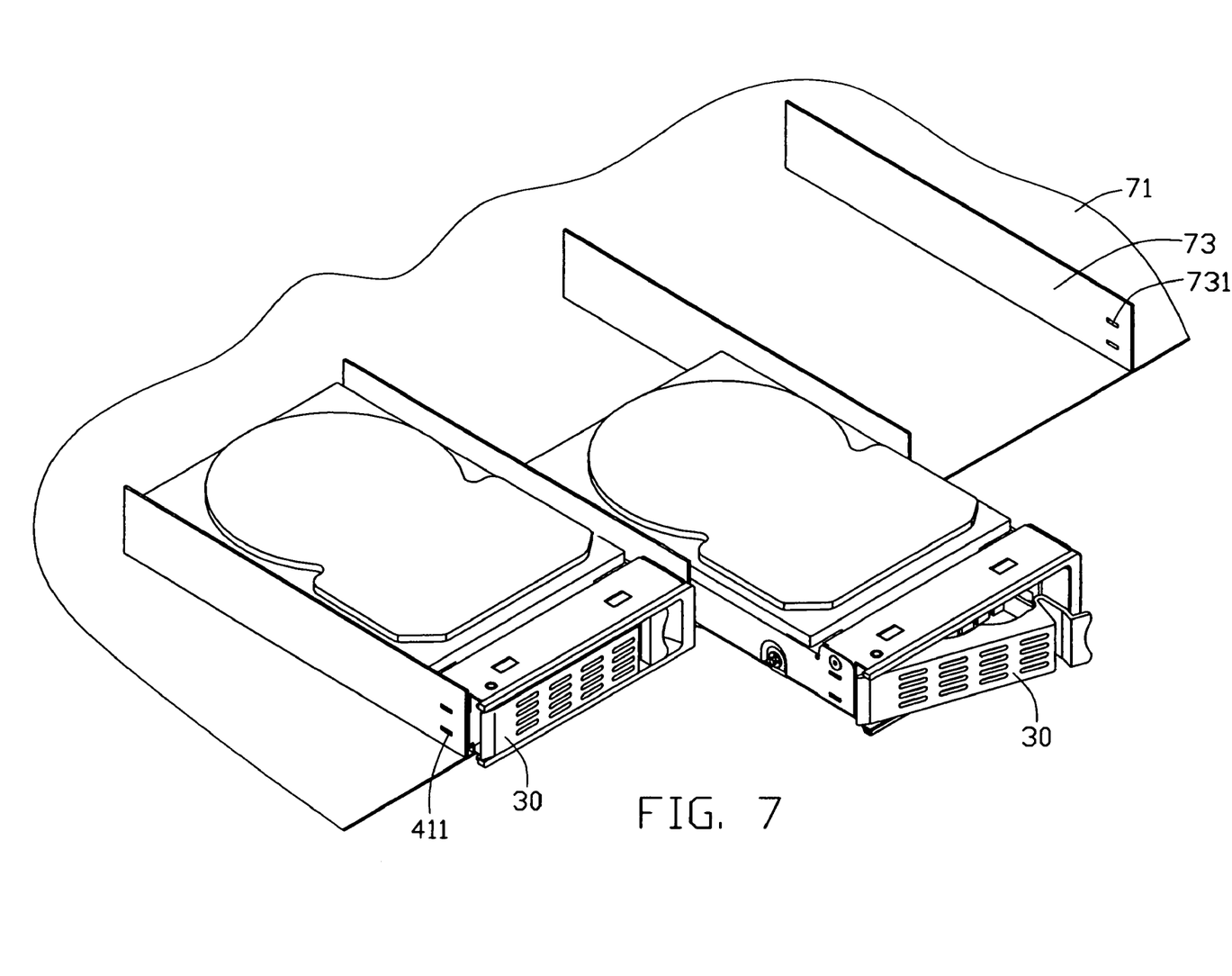
FIG. 7 is a fully assembled view of the FIG. 1, showing a plurality of storage device assemblies in different status.

Referring also to FIGS. 5 to 7, in assembly, the actuator slider 40 is located in the inner space of the bracket 20. The horizontal plates 41 of the slider 40 are sandwiched between the supports 211 of the bracket 20. The flanges 44 are received between the supports 221 and the left part 232 of the connecting panel 23. The spring 28 is elastically disposed between the post 2331 of the bracket 20 and the post 451 of the slider 40. When the slider 40 is pushed toward the middle part 233 of the connecting panel 23, the resilient hook 2323 is driven outwardly and allows the bent tab 441 to pass by. Then the hook 2323 rebounds to prevent a detachment of the slider 40 from the bracket 20. The actuator 30 is disposed in the outer space of the bracket 20. The actuating tab 311 extends into the opening 2321 of the connecting panel 23 of the bracket 20 and abuts the stop board 47 of the slider 40. The wedge 351 extends into the cutout 251 of the vertical board 25 of the bracket 20.

The combined bracket 20, the actuator 30, and the slider 40 are attached in the tray 10. A bottom portion of the shaft 31 is received in the pivot seat 143 of the tray 10. The wedge-shaped extension tabs 411 of the slider 40 extend through the apertures 121 of the tray 10, and then into the apertures 731 of the chassis 70, therefore attaching the tray 10 to the chassis 70. The blocks 211 of the bottom panel 22 of the bracket 20 are received in the slots 141 of the tray 10.

The cover 50 is attached to the bracket 10. A top portion of the shaft 31 extends into the pivot hole 511 of the cover 50. The blocks 211 of the top panel 51 of the bracket 20 are received in the slots 513 of the cover 50. The ears 55 of the cover 50 abut inner surfaces of the front portions 122 of the sidewalls 12 of the tray 10. A plurality of conventional fasteners is extended through the fixing holes 123 of the tray 10 and engages in the fixing holes 551 of the cover 50 to secure the cover 50 to the tray 10.

A plurality of screws 64 is extended through the through holes 125 of the tray 10 and engages in the screw holes 62 of the hard disk drive 60 to secure the hard disk drive 60 in the tray 10. The assembled tray 10 is slidably inserted in the chassis 70 by conventional means, such as a slider of the tray 10 engaging with a guider of the chassis.

When the tray 10 slides into the chassis 70, the extension tabs 411 of the slider 40 are blocked by the spacing plates 73 and retract into the tray 10. The slider 40 is pushed toward the middle part 233 of connecting panel 23 of the bracket 20, with the spring 28 depressed. When the apertures 121 of the tray 10 align with the apertures 731 of the chassis 70, the tabs 411 extend into the apertures 731. Thus the hard disk drive 60 and the tray 10 are secured in the chassis 70. Simultaneously, the spring 28 rebounds and the slider 40 moves back to its original position.

In drawing the tray 10 out from the chassis 70, the resilient handle 35 of the actuator 30 is squeezed toward the shaft 31 so that the wedge 351 is withdrew from the cutout 251 of the bracket 20. Then the actuator 30 is rotated outwardly about the pivot shaft 31, the actuating tab 311 of the actuator 30 pushes the stop board 47 of the slider 40 to move the slider 40 toward the middle part 233 of the bracket 20. Accordingly, the extension tabs 411 are withdrawn from the apertures 731 of the chassis 70 and the apertures 121 of the tray 10. The tray 10 is thus disengaged from the chassis 70 and easily drawn out therefrom.

It is to be understood, however, that even though numerous characteristics and advantages of the present invention have been set forth in the foregoing description, together with detail members of the structure and function of the invention, the disclosure is illustrative only, and changes may be made in detail member, especially in matters of shape, size, and arrangement of parts within the principles of the invention to full extent indicated by the broad general meaning of the terms in which the appended claims are expressed.

What is claimed is:

1. An assembly comprising:
   a chassis comprising a bottom and a pair of spacing plates, one of the spacing plates defining a first aperture therein;
   a tray received in the chassis between the spacing plates, the tray comprising a base and a pair of sidewalls defining a space adapted to receive a storage device, one of the sidewalls defining a second aperture therein;
   a bracket attached to the tray, the bracket comprising a top panel, a bottom panel, a connecting panel disposed between the top and the bottom panels, and a vertical board extending from the connecting panel;
   a slider movably received in an inner side of the bracket, the slider comprising a stop board, and an extension tab corresponding to the second aperture of the tray;
   a spring disposed between the slider and the bracket; and
   an actuator pivotally fixed in an outer side of the bracket, one end of the actuator forming an actuating tab abutting the stop board of the slider, the other end of the actuator forming a resilient handle detachably engaging with the vertical board;
   wherein the tray is received between the spacing plates with the extension tab of the slider extending through the second aperture of the tray and into the first aperture of said one of the spacing plates under the pressure of the spring, and wherein when the actuator is pivoted outwardly relative to the bracket after disengaging the resilient handle from the vertical board, the actuating tab presses the stop board of the slider to push the slider to move away from said one of the spacing plates so that the slider compresses the spring and the extension tab is withdrawn from the first aperture of the chassis, the tray is therefore being drawable out from the chassis.

2. The assembly as described in claim 1, wherein the base of the tray defines a plurality of first slots therein, the bottom panel of bracket correspondingly extends a plurality of first blocks engaging in the first slots.

3. The assembly as described in claim 1, further comprising a cover attached to the tray, wherein the cover comprises a first plate, and a second plate depending from the first plate, a pivot hole is defined in the first plate for receiving an upper portion of the shaft of the actuator.

4. The assembly as described in claim 3, wherein a pivot seat is formed on the base of the tray for pivotally receiving a lower portion of the shaft of the actuator.

5. The assembly as described in claim 3, wherein the second plate of the cover forms a plurality of tips at a bottom edge therefrom, the base of the tray defines a plurality of slits for receiving the tips.

6. The assembly as described in claim 3, wherein a pair of ears depends from both sides of the first plate, the ears define fixing holes therein corresponding to fixing holes of the tray for extension of fasteners.

7. The assembly as described in claim 3, wherein the first plate of the cover defines a plurality of second slots therein, the top panel of the bracket correspondingly extends a plurality of second blocks engagingly received in the second slots.

8. The assembly as described in claim 1, wherein the connecting panel of the bracket is Z-shaped, which comprises a first part, a second part, and a third part generally perpendicularly located between the first part and the second part.

9. The assembly as describe in claim 8, wherein the third part of the connecting panel extends a first post, the slider comprises an end board extending a second post, the spring is disposed between the first post and the second post.

10. The assembly as describe in claim 8 wherein the first part of the connecting panel defines an opening, the actuating tab of the actuator extends through the opening and abutting the stopping board of the slider.

11. The assembly as describe in claim 1, wherein the vertical board of the bracket defines a cutout, the resilient handle of the actuator extends a wedge engagingly received in the cutout.

12. The assembly as describe in claim 1, wherein the top panel and the bottom panel of the bracket extend a plurality of supports toward each other for restricting the spring therebetween, the slider forms a pair of flanges slideably sandwiched between the supports and the inner side of the bracket.

13. The assembly as describe in claim 8, wherein the second part of the connecting panel extends a resilient hook, the horizontal plates of the slider forms a pair of bent tabs, the bent tabs engage with the hook to prevent detachment of the slider from the bracket.

* * * * *